US012542796B2

United States Patent
Swift et al.

(10) Patent No.: US 12,542,796 B2
(45) Date of Patent: Feb. 3, 2026

(54) DARK PATTERN DETECTION AND MITIGATION

(71) Applicant: International Business Machines Corporation, Armonk, NY (US)

(72) Inventors: Mary Diane Swift, Rochester, NY (US); Irene Lizeth Manotas Gutiérrez, White Plains, NY (US); Jonathan D. Dunne, Dungarvan (IE); Daphne Coates, St. Leonards on Sea (GB)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 17/644,566

(22) Filed: Dec. 16, 2021

(65) Prior Publication Data

US 2023/0199014 A1    Jun. 22, 2023

(51) Int. Cl.
 *H04L 9/40* (2022.01)
 *G06N 3/08* (2023.01)
 *G06V 40/20* (2022.01)

(52) U.S. Cl.
 CPC .......... *H04L 63/1433* (2013.01); *G06N 3/08* (2013.01); *H04L 63/1483* (2013.01); *G06V 40/20* (2022.01)

(58) Field of Classification Search
 CPC ... H04L 63/1433; H04L 63/1483; G06N 3/08; G06V 40/20
 See application file for complete search history.

(56) References Cited

U.S. PATENT DOCUMENTS

| 8,262,447 | B2 | 9/2012 | Murrell | |
|---|---|---|---|---|
| 2008/0291159 | A1 | 11/2008 | Wang | |
| 2009/0282464 | A1 | 11/2009 | Bauchot | |
| 2010/0186088 | A1* | 7/2010 | Banerjee | H04L 63/1433 709/224 |
| 2013/0030887 | A1 | 1/2013 | Calman | |
| 2016/0006760 | A1* | 1/2016 | Lala | G06F 21/51 726/23 |

(Continued)

FOREIGN PATENT DOCUMENTS

| CN | 103152347 A | 6/2013 |
|---|---|---|
| CN | 104580092 A | 4/2015 |
| CN | 107292714 A | 10/2017 |

OTHER PUBLICATIONS

Mathur et al., "Dark Patterns at Scale: Findings from a Crawl of 11k Shopping Websites", Retrieved From https://arxiv.org/pdf/1907.07032, Published Nov. 2019 (Year: 2019).*

(Continued)

*Primary Examiner* — Chau Le
(74) *Attorney, Agent, or Firm* — James L. Olsen

(57) ABSTRACT

A user is detected navigating to a webpage. A plurality of web elements of the webpage is identified. One or more web elements is determined to have a risk score that surpasses a risk threshold of being a dark pattern. The risk score is identified by analyzing each of the plurality of web elements. A mitigation action configured to counteract the dark pattern is executed in response to the one or more web elements having the risk score that surpasses the risk threshold. The mitigating action is executed substantially immediately upon the user navigating to the webpage.

20 Claims, 3 Drawing Sheets

(56) References Cited

U.S. PATENT DOCUMENTS

| | | | |
|---|---|---|---|
| 2018/0205758 A1* | 7/2018 | Yang | H04L 63/1425 |
| 2018/0288073 A1* | 10/2018 | Hopper | H04L 63/1425 |
| 2019/0065027 A1 | 2/2019 | Hauenstein | |
| 2021/0144174 A1* | 5/2021 | N | H04L 63/1483 |
| 2021/0319100 A1* | 10/2021 | Coyle-Gilchrist | G06F 21/554 |
| 2021/0400064 A1* | 12/2021 | Bitton | G06F 21/554 |
| 2022/0180368 A1* | 6/2022 | Immaneni | G06Q 20/4014 |
| 2022/0327541 A1* | 10/2022 | Seguritan | G06Q 20/4016 |

OTHER PUBLICATIONS

"A Brief Overview of the Federal Trade Commission's Investigative, Law Enforcement, and Rulemaking Authority," Federal Trade Commission, May 2021, 11 pages. <https://www.ftc.gov/about-ftc/what-we-do/enforcement-authority>.

"FTC Finalizes Settlement with Company that Misled Consumers about how it Accesses and Uses their Email," Federal Trade Commission, Dec. 17, 2019, 2 pages. <https://bit.ly/3h017PF>.

"FTC Sues Owner of Online Dating Service Match.com for Using Fake Love Interest Ads To Trick Consumers into Paying for a Match.com Subscription," Federal Trade Commission, Sep. 25, 2019, 3 pages. <https://bit.ly/3dArhUb>.

"Guidelines Apr. 2019 on Article 25: Data Protection by Design and by Default" European Data Protection Board, Nov. 12-13, 2019, 27 pages. <https://bit.ly/3710o9s>.

"Senators Introduce Bipartisan Legislation to Ban Manipulative 'Dark Patterns,'" Deb Fischer United States Senator for Nebraska, Press Release, Apr. 9, 2019, 3 pages. <https://bit.ly/3eQO4LT>.

"The CNIL's restricted committee imposes a financial penalty of 50 Million euros against Google LLC," Commission Nationale de l'Informatique et des Libertés (CNIL), Jan. 21, 2019, 2 pages. <https://www.cnil.fr/en/cnils-restricted-committee-imposes-financial-penalty-50-million-euros-against-google-llc>.

Acquisti et al., "Nudges for Privacy and Security: Understanding and Assisting Users' Choices Online," ACM Computing Surveys, vol. 50, Issue 3, Article No. 44, Oct. 2017, 41 pages. <https://dl.acm.org/doi/10.1145/3054926>.

Bizer et al., "Direct Evidence of Ending-Digit Drop-Off in Price Information Processing," Psychology and Marketing, vol. 22, No. 10, Oct. 2005, pp. 771-783.

Bosch et al., "Tales from the Dark Side: Privacy Dark Strategies and Privacy Dark Patterns," Proceedings on Privacy Enhancing Technologies (4), Jun. 2, 2016, pp. 237-254.

Calo, "Digital Market Manipulation" George Washington Law Review, vol. 82, No. 4, Aug. 2014, pp. 995-1051. <http://www.gwlr.org/wp-content/uploads/2014/10/Calo_82_41.pdf>.

De Marcellis-Warin et al., "Artificial Intelligence and Market Manipulations: Ex-ante Evaluation in the Regulator's Arsenal." Cirano, Dec. 2020, 39 pages. <https://ssrn.com/abstract=3744497>.

Deterding, "Toward Economic Platform Studies," Prepared for the 12th Annual Game Research Lab Spring Seminar "Money and Games," Apr. 1, 2016, 20 pages.

Di Geronimo et al., "UI Dark Patterns and Where to Find Them: A Study on Mobile Applications and User Perception," Proceedings of the 2020 CHI Conference on Human Factors in Computing Systems (CHI '20), Apr. 25-30, 2020, 14 pages. <https://dl.acm.org/doi/10.1145/3313831.3376600>.

Elliott et al., "Here's How TurboTax Just Tricked You Into Paying to File Your Taxes," ProPublica, Apr. 22, 2019, 14 pages. <https://www.propublica.org/article/turbotax-just-tricked-you-into-paying-to-file-your-taxes>.

Friedman et al., "Value Sensitive Design and Information Systems," Human-Computer Interaction in Management Information Systems: Foundations, Jan. 2006, 27 pages.

Goldstein et al., "A Room With a Viewpoint: Using Social Norms to Motivate Environmental Conservation in Hotels," Journal of Consumer Research, vol. 35, No. 3, Oct. 2008, pp. 472-482.

Gray et al., "Dark Patterns and the Legal Requirements of Consent Banners: An Interaction Criticism Perspective," arXiv:2009.10194v1 [cs.HC], Sep. 21, 2020, 26 pages.

Gray et al., "The Dark (Patterns) Side of UX Design," Proceedings of the 2018 CHI Conference on Human Factors in Computing Systems (CHI '18), Apr. 21-26, 2018, Paper No. 534, 14 pages. <https://dl.acm.org/doi/10.1145/3173574.3174108>.

Johnson et al., "Do defaults save lives?" Science, vol. 302, Nov. 21, 2003, pp. 1338-1339. <https://www.researchgate.net/publication/8996952_Medicine_Do_defaults_save_lives>.

Luguri et al., "Shining a Light on Dark Patterns," Behavioral & Experimental Economics eJournal, Aug. 1, 2019, 51 pages. <https://www.oag.ca.gov/sites/all/files/agweb/pdfs/privacy/shining-a-light-on-dark-patterns.pdf>.

Maier et al., "Dark Design Patterns: An End-user Perspective," Human Technology, vol. 16, No. 2, Aug. 2020, pp. 170-199. <http://umu.diva-portal.org/smash/get/diva2:1462760/FULLTEXT01.pdf>.

Mathur et al., "Dark Patterns at Scale: Findings from a Crawl of 11K Shopping Websites," Proceedings of the ACM on Human-Computer Interaction, vol. 3, No. CSCW, Article 81, Nov. 2019, 32 pages.

Mathur et al., "What Makes a Dark Pattern . . . Dark?: Design Attributes, Normative Considerations, and Measurement Methods," Proceedings of the 2021 CHI Conference on Human Factors in Computing Systems (CHI '21), Article No. 360, May 8-13, 2021, 27 pages.

McLaughlin, "9 iconic growth hacks tech companies used to boost their user bases," TNW New, May 28, 2014, 7 pages.

Monaco, "Bug or Feature? Covert Impairments to Human Computer Interaction." Proceedings of the 2020 CHI Conference on Human Factors in Computing Systems, Paper 703, Apr. 25-30, 2020, 15 pages.

Scheiber, "How Uber Uses Psychological Tricks to Push Its Drivers' Buttons," New York Times, Apr. 2, 2017, 11 pages. <https://nyti.ms/3h3RuNk>.

Smullen et al., "Managing Potentially Intrusive Practices in the Browser: A User-Centered Perspective." Proceedings on Privacy Enhancing Technologies; 2021(4), pp. 500-527.

Truby et al., "Human digital thought clones: the Holy Grail of artificial intelligence for big data," Information & Communications Technology Law, vol. 30, No. 2, Dec. 1, 2021, pp. 140-168.

Utz et al., "(Un)informed Consent: Studying GDPR Consent Notices in the Field," Proceedings of the 2019 ACM SIGSAC Conference on Computer and Communications Security (CCS '19), Nov. 2019, pp. 973-990. <https://dl.acm.org/doi/10.1145/3319535.3354212>.

Zagal et al., "Dark Patterns in the Design of Games," Foundations of Digital Games 2013, 2013, 8 pages.

International Search Report and Written Opinion dated Dec. 22, 2022, for International Application No. PCT/CN2022/123735, filed Oct. 8, 2022.

Ford, G., Federal Trade Commission, , Retrieved from: https://bit.ly/2XxHwft, 2013, 1 pages.

Mead, D., How Reddit Got Huge: Tons of Fake Accounts, Retrieved from: https://www.vice.com/en_us/article/z4444w/how-reddit-got-huge-tons-of-fake-accounts--2Jun. 21, 2012, 9 pages.

Narayanan, A., Proposal: an AdBlockPlus-like browser extension backed by a crowd-sourced repository of Dark Patterns—as you browse, it would highlight UI elements that are attempting to manipulate or trick you., Retrieved from: https://twitter.com/random_walker/status/985528620398628864?lang=en, Apr. 15, 2018, 1 pages.

Rosoff, M., Airbnb Farmed Craigslist To Grow Its Listings, Says Competitor, Business Insider, Jun. 1, 2011, 3 pages.

Soe, et al., Circumvention By Design—Dark Patterns In Cookie Consent For Online News Outlets, Proceedings of the 11th Nordic Conference on Human-Computer Interaction: Shaping Experiences, Shaping Society, Oct. 26, 2020, Article No. 19, 12 pages.

Strange, et al., LinkedIn Pays Big After Class Action Lawsuit Over User Emails, Mashable, Oct. 3, 2015, 7 pages.

Susser, D. et al., Online Manipulation: Hidden Influences In A Digital World, Georgetown Law Technology Review, vol. 4, Issue 1 (2019), 45 pages.

Thaler, et al., Nudge: Improving Decisions About Health, Wealth, and Happiness, Penguin Books, Jun. 2009, 9 pages.

(56) References Cited

OTHER PUBLICATIONS

Thaler, H., Nudge, not sludge, Aug. 3, 2018, Science AAAS, vol. 361, No. 6401, 1 page.
Tversky, et al., Judgment Under Uncertainty: Heuristics And Biases, Science AAAS, Sep. 27, 1974, vol. 185, No. 4157, pp. 1124-1131.
Venkatadri, et al., Investigating Sources Of PII Used In Facebook's Targeted Advertising, Proceedings on Privacy Enhancing Technologies, Jan. 2019, vol. 1, pp. 227-244.
Wakabayashi, et al., Why Google Backtracked on Its New Search Results Look, Retrieved from: https://nyti.ms/2XYvg6l., Jan. 31, 2020, 6 pages.
Waldman, A.E., Cognitive Biases, Dark Patterns, And The 'Privacy Paradox, SSRN, Feb. 2020, vol. 31, pp. 105-109.

\* cited by examiner

DARK PATTERN DETECTION AND MITIGATION

BACKGROUND

User interface (UI) design is getting increasingly sophisticated. One example of increasingly sophisticated and nuanced design is webpage UI for commercial websites. This includes purposefully designing numerous elements of a webpage UI to engineer an experience of a user visiting and using that webpage. In many situations, this may serve a benign or beneficial purpose, such as trying to improve ease-of-use and guide users to identify UI web elements that the user is predicted to want to utilize. In other examples, UI design may be engineered to attempt to psychologically manipulate a user into something they would not otherwise do, such as to purchase a product, purchase insurance for a product, purchase a premium version of a product, or the like. UI design focused on manipulating or tricking users into actions is generally referred to dark patterns.

SUMMARY

Aspects of the present disclosure relate to a method, system, and computer program product relating to detecting and mitigating dark patterns in web pages. For example, the method includes detecting a user navigate to a webpage. The method further includes identifying a plurality of web elements of the webpage. The method further includes determining, by analyzing each of the plurality of web elements, that one or more web elements has a risk score that surpasses a risk threshold of being a dark pattern. The method further includes executing, substantially immediately upon the user navigating to the webpage, a mitigation action configured to counteract the dark pattern in response to the one or more elements surpassing the risk threshold. A computing system and computer program product configured to execute the above method are also described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
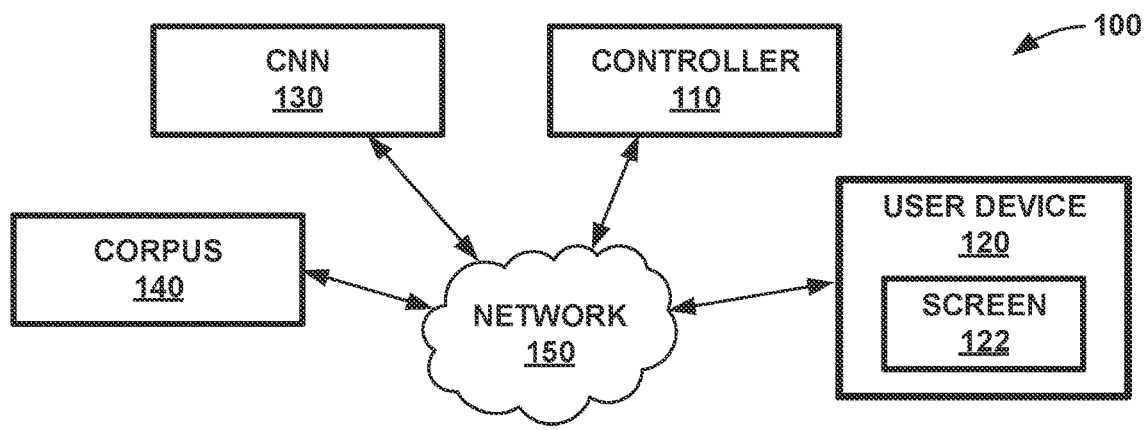
FIG. 1A depicts a conceptual diagram of an example environment in which a controller may detect and mitigate dark patterns being displayed on a screen of a user device using a corpus and/or convolutional neural network.
Figure 1B:
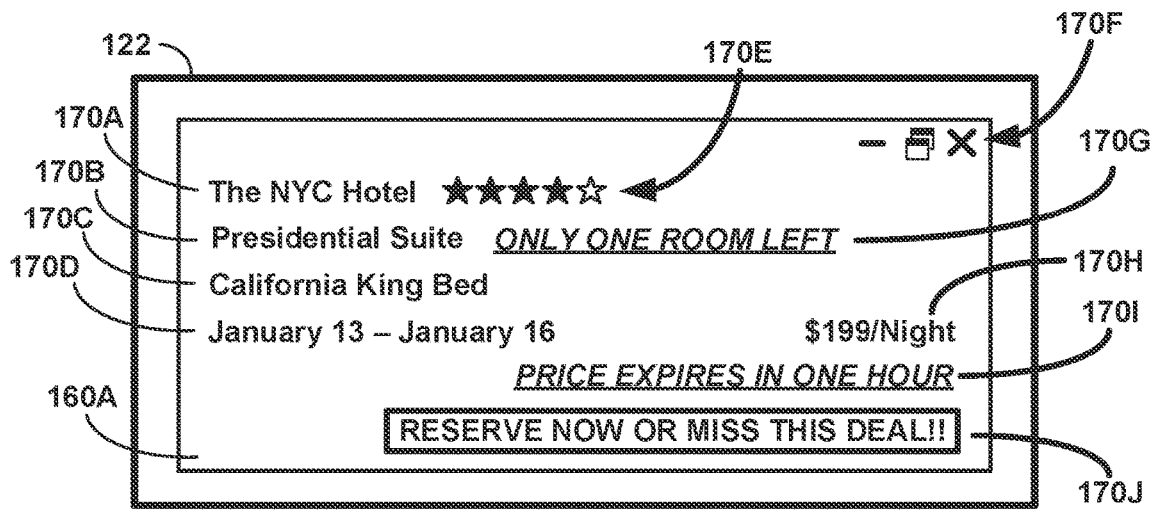
FIG. 1B depicts an example user interface of a webpage being shown on the screen of FIG. 1A in which the controller of FIG. 1A might detect dark patterns.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to addressing dark patterns, while more particular aspects of the present disclosure relate to training a machine learning model to detect dark patterns and execute mitigating actions to counteract these dark patterns as a user navigates to webpages. While the present disclosure is not necessarily limited to such applications, various aspects of the disclosure may be appreciated through a discussion of various examples using this context.

User interface (UI) design for webpages is increasingly focused on how different sets of webpage elements impact how a user experiences and uses a given webpage. For example, primary webpages of large organizations may receive a substantial amount of thought, research, and testing in determining which web elements to include in webpages, where/when/how to present web elements within these webpages, or the like. Such design choices may be beneficial to both users/customers of the webpage and also providers of the webpage.

However, other design choices may primarily or exclusively be beneficial to providers of the webpage, such as advertisements. Many users prefer to not see some or all ads when browsing. Conventional web browsers may address this through the use of tools such as ad blockers that are configured to block the graphical generation of ads. Ad blockers may work by crawling through lines of code of the webpage and suppressing (or otherwise stopping from displaying) gifs, or flash code, or the like. In this way, through tools such as ad blocking, conventional web browsers may be configured to suppress some ads as preferred by users.

Another example of UI design choices that are primarily/exclusively beneficial to webpage providers is dark patterns. Dark patterns may be understood to be user interface web elements that are intentionally configured to manipulate users into making decisions that the users might not otherwise make. For example, dark patterns may purposefully deceive users, and/or dark patterns may covertly manipulate or coerce users into making choices that are not in their own best interests, but are rather in the interest of an entity behind the webpage.

An example of a dark pattern includes an offer countdown. Specifically, some UIs include "false" offer countdowns, where the advertised price is not actually tied at all to the advertised price. Rather, in some cases the advertised price will be valid well past the provided timer, such that the primary/single purpose of the offer countdown is to attempt to pressure a user into making a purchase that the user would not otherwise make at that time. Such a dark pattern is a common tactic, often as used on shopping websites. Other examples of dark patterns include counts of how many of a product remains (e.g., such as indicating that only one of a item remains to be purchased even if there are more than one and/or if additional units are scheduled to be available shortly), or listing a number of other customers that are viewing the same product, or the like.

Conventional internet browsers (and other conventional browsing functionality) may lack a technical ability to detect (much less counter) these dark patterns. For example, conventional ad blockers may miss dark patterns, as the elements that realize dark patterns may do so with flash code or gifs or the like. Specifically, webpage elements that are used to generate dark patterns may be "standard" lines of static text within the code, or other forms of code that are not detected as "ads" by conventional ad blockers. Being as conventional ad blockers lack a technical ability to detect web elements that indicate these dark patterns, conventional ad blockers therefore also lack a technical ability to do anything to counteract these dark patterns (such as block web elements behind these dark patterns as they block advertisements).

Aspects of this disclosure may solve or otherwise address some or all of these problems of conventional solutions in this realm. For example, aspects of this disclosure relate to training a neural network to calculate dark pattern risk scores of web elements of webpages, in response to which aspects of this disclosure mitigate any detected dark pattern by blocking/modifying these web elements and/or alerting a user to the presence (and/or intention) of these web elements. A computing device that includes a processing unit executing instructions stored on a memory may provide the functionality that addresses these problems, this computing device herein referred to as a controller. Though for purposes of clarity this controller is depicted as a being provided by a standalone computing device, in other examples some or all functionality of the controller may be provided as functionality of a local computing device, such as a plug-in for a web browser.

Figure 2:
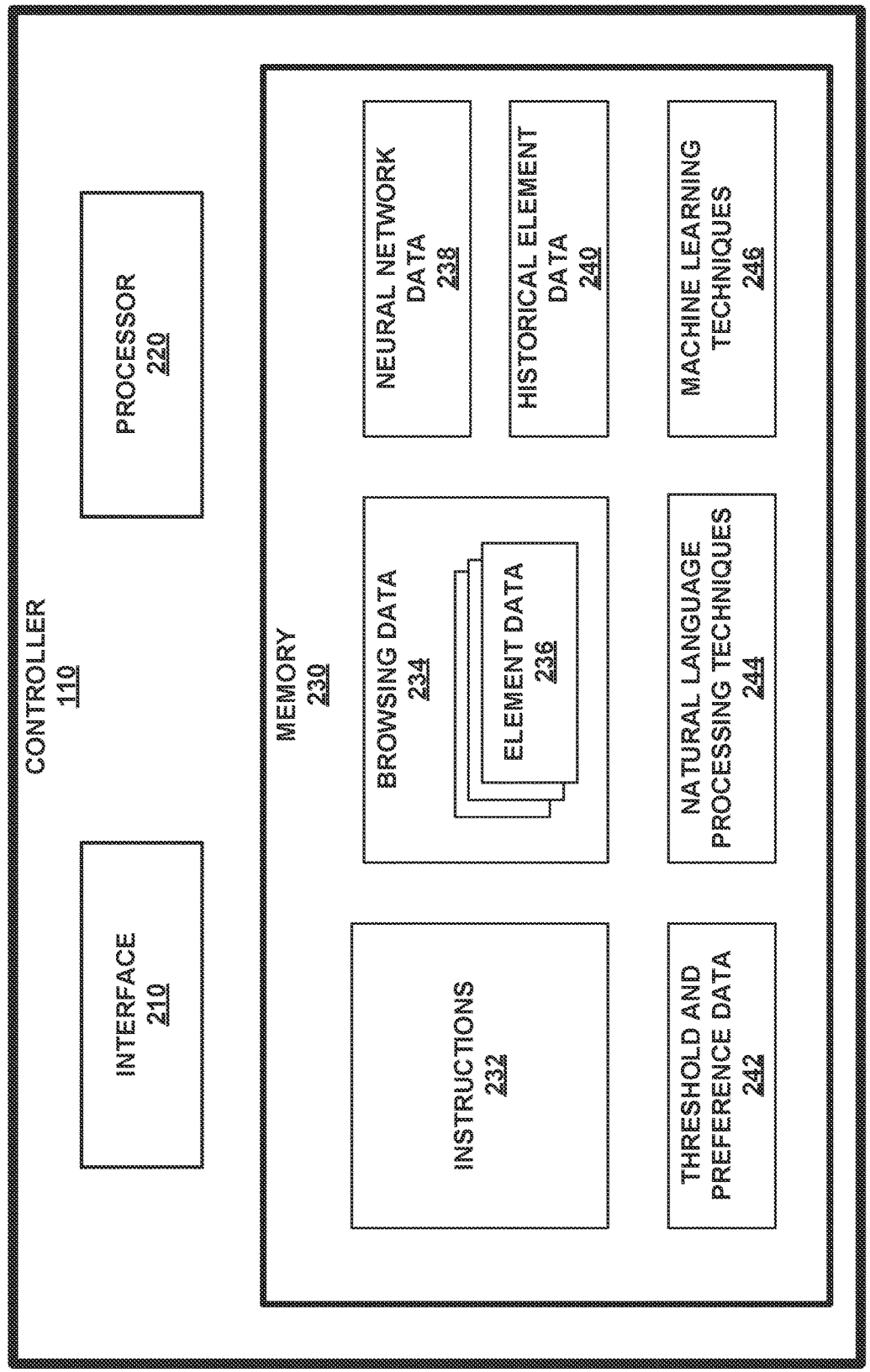
FIG. 2 depicts a conceptual box diagram of example components of the controller of FIG. 1.

For example, FIG. 1A depicts environment 100 in which controller 110 detects web pages that surpass a risk threshold of being dark patterns and therein mitigate these dark patterns. Controller 110 may include a processor coupled to a memory (as depicted in FIG. 2) that stores instructions that cause controller 110 to execute the operations discussed herein. Controller 110 may detect web pages as being visited on user device 120. User device 120 may also include a computing device (similar to computing system of FIG. 2), such as smart phones, laptops, desktops, tablets, or the like. As discussed herein, some or all of the functionality attributed to controller 110 may be installed as, e.g., a plugin, on user device 120.

Controller 110 may monitor web pages being navigated to, and subsequently graphically generated on screen 122, via user device 120. Screen 122 may include any variety of computer display known to one of ordinary skill in the art upon which a dark pattern may appear. Screen 122 may be physical integral to user device 120 (e.g., a touch screen of a mobile device), and/or screen 122 may be a separate physical component that is physically coupled to user device 120 (e.g., a standalone monitor coupled to a tower of user device 120 via a cord).

Controller 110 may utilize a neural network in analyzing web pages of user device 120. For example, controller 110 may utilize convolutional neural network (CNN) 130 in detecting and mitigating dark patterns. Though CNN 130 is discussed as a convolutional neural network, in other examples environment 100 and controller 110 may use other types of machine learning models or neural networks to detect dark patterns as discussed herein. CNN 130 may be trained to calculate a risk score of webpage elements. CNN 130 may be trained using machine learning (ML) training techniques as described herein.

For example, CNN 130 may be trained using webpage data from corpus 140, and/or from browsing sessions from one or more user devices 120. CNN 130 may have gone through supervised or unsupervised trained by having CNN 130 account for data points such as the specific webpage elements that a user was gazing at on screen 122, how long the user was looking at these webpage elements, features of the webpage elements (e.g., as identified by analyzing the source code), natural language processing (NLP) of the text of the page, image recognition analysis of the images of the page, or the like. CNN 130 may receive data relating to web elements of a webpage, a user interact with those web elements (e.g., gazing at those web elements, clicking on them, hiding them, etc.), and a subsequent user action (e.g., purchasing an item or leaving the page) to learn what does and does not raise the risk of a dark pattern being present on a given webpage.

For example, CNN 130 may be trained to identify code of web elements that corresponds to various graphical objects (such as graphically generated timers), and CNN 130 may be fed data that shows users gazing at these graphically objects. CNN 130 may further be fed data that corresponds to user actions—such as when users accepted deals, when users turned down deals, or when users purchased more/less expensive items—in determining whether the code/web elements likely do or likely do not (or somewhere in between) indicate a dark pattern.

CNN 130 may be fed this data as stored in corpus 140, which may include raw versions of this data. For example, controller 110 may have gathered opt-ins from users looking to suppress webpage elements that include dark patterns. Such opt-ins may give controller 110 permission to capture data such: as where on computer screen 122 a user is looking; computing operations that a user executes; what is being graphically generated on computer screen 122, or the like. Controller 110 may be configured to only capture this data during sessions that are detected to have a risk of dark patterns, such as web browsing shopping session or the like. Controller 110 may gather this data from a statistically significant number of user devices 120 being used by a statistically significant number of users. Once controller 110 gathers this information, a data scientist may organize this data into training data sets to train and test CNN 130.

CNN 130 may be trained to identify correlations (and strengths thereof) between all of these different factors, and therein determine webpage elements that have positive correlations with users purchasing items. While in general a positive correlation may simply relate to a pleasant and intuitive UI (e.g., as a user may be more likely to buy a product when they enjoyed the experience of shopping for that product), if a correlation becomes strong enough CNN 130 may determine that some elements are a dark pattern. For example, CNN 130 may compare identical and/or substantially similar products (e.g., products that in general have equal rates of production, equal rates of sale, and have generally equal price points). CNN 130 may further identify that products are selling at a significantly higher rate at one webpage with a first set of webpage elements than identical/substantially similar products selling at a significantly lower rate at a second webpage with a second set of webpage elements. In response to this, CNN 130 may identify one or more of these web elements as having a high risk score of being a dark pattern. This may include identifying web elements that are present on a first webpage with a significantly higher sale rate but not present on a second webpage with a significantly lower sale rate. CNN 130 may be trained to calculate these web elements on the first page as having a higher risk score, particularly when these web elements are similar to other web elements that have been found to indicate dark patterns.

CNN 130 may be trained to identify trends as to when various webpages are more likely to be a dark pattern by virtue of some factors outside of the webpage itself. For example, CNN 130 may be trained to identify that dark patterns are more likely to exist during various times of the year, such as an increased risk during shopping seasons for toys, or an increased risk during vacation seasons for hotels/ resorts. For another example, CNN 130 may be trained to determine that certain times of day may raise the risk of dark patterns, such as during a lunch hour rush for a restaurant, or late at night for certain types of impulse shopping items. Accordingly, CNN 130 may be trained to account for a time frame of a web session (e.g., whether a seasonal time frame or a time frame on a 24 hour clock) and a type of the webpage, and adjust calculated risk scores accordingly. Specifically, CNN 130 may be trained to calculate risk scores of web elements as relatively higher when a time frame and webpage type align as posing a higher risk of being a web pattern.

In some examples, CNN 130 may be trained to account for user demographics in calculating risk scores. For example, CNN 130 may be trained to identify that some users are more susceptible to dark patterns, such that for these users risk scores are higher (and therein controller 110 is more likely to execute a mitigating action). This may include CNN 130 determining that users of certain ages (e.g., children or the elderly) are more susceptible to dark patterns. This may also include CNN 130 determining that users that lack a certain type of specialized knowledge (e.g., medical knowledge or legal knowledge) may be more susceptible to dark patterns in webpages that are related to these types of specialized knowledge. Controller 110 may gather information about a user using user device 120 (following this user opting-in to such gathering) in order to provide this information to CNN 130 during analysis of web elements (e.g., such that CNN 130 may accurately calculate risk scores that fully apply to the current browsing session).

Controller 110 may identify dark patterns of elements on webpages of screens 122 of user devices 120 using CNN 130 over network 150. Network 150 may include a computing network over which computing messages may be sent and/or received. For example, network 150 may include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, user device 120, CNN 130, and/or corpus 140) may receive messages and/or instructions from and/or through network 150 and forward the messages and/or instructions for storage or execution or the like to a respective memory or processor of the respective computing/ processing device. Though network 150 is depicted as a single entity in FIG. 1A for purposes of illustration, in other examples network 150 may include a plurality of private and/or public networks over which controller 110 may detect and mitigate dark patterns described herein.

For example, controller 110 may identify web elements 170A-170J (collectively, "web elements 170") of UI of webpage 160A that a user is accessing via screen 122 of user device 120. Controller 110 may identify web elements 170 as a plugin installed onto user device 120, such as installed to one or more web browsers of user device 120. As discussed herein, web elements 170 may be any variety of graphical element of webpage 160A that CNN 130 detects to increase a risk of dark patterns. For example, as depicted, web elements 170 may include text (170A-170D, 170G-170J) or non-text (170E, 170F). Web elements 170 may be static (e.g., unchanging) or dynamic (e.g., graphically changing over time and/or in response to user interaction). Similarly, web elements 170 may be hyperlinks, and/or web elements 170 may be purely graphical (e.g., such that a user may not interact with this web element 170 beyond viewing it).

Controller 110 may use CNN 130 to analyze each of web elements 170 of UI of webpage 160A. Controller 110 may use CNN 130 to determine that some web elements 170 that cause users to purchase at a higher frequency do not constitute a high risk of a dark pattern (e.g., but rather are the result of a superior product, or a more pleasant user interface). For example, controller 110 may cause CNN 130 to analyze web element 170E and identify that web element 170E (which is four stars out of five) has a higher correlation to a user purchasing the provided product than a similar web element 170 (e.g., one that had only one star out of five), but CNN 130 may identify that this is related to a better product rather than a dark pattern (e.g., CNN 130 may use identify this using various NLP techniques as described herein to conceptualize this collective understanding).

Controller 110 may identify some web elements 170 as having a risk score that surpasses a threshold. For example, controller 110 may identify web elements 170G, 170I, 170J as having a risk score (of being a dark pattern) that surpasses a threshold. Specifically, controller 110 may identify that CNN 130 determines that each of web elements 170G, 170I, 170J has a risk score of being a dark pattern that does more to manipulate a user (e.g., manipulate a user into making a purchase) than it does to provide fully meaningful data to the user.

Figure 1C:
FIG. 1C depicts an example user interface of the webpage of FIG. 1B after the controller executes a mitigation action to counteract the detected dark patterns.

Controller 110 may execute mitigation actions to counteract dark patterns of web elements 170 that have more than a threshold risk of being a dark pattern. For example, FIG. 1C depicts an example UI of webpage 160B in which controller 110 may mitigate web elements 170 that have more than a threshold risk of being a dark pattern. Though webpage 160B may have the identical uniform resource locator (URL) as webpage 160A, webpage 160B may graphically differ from webpage 160A as a result of the mitigating action(s) (webpage 160A, 160B collectively referred to herein as "webpages 160"). The mitigating action includes controller 110 blocking web elements 170G, 170I that have more than a threshold risk score. For example, as depicted in FIG. 1C, web elements 170G, 170I are graphically not shown on UI of webpage 160B, despite them being part of webpage 160A. Controller 110 may block web elements 170G, 170I substantially immediately upon a user navigating to webpages 160, such that web elements 170G, 170I that have more than a threshold risk are not graphically generated at all, or are only generated for a short period of time (e.g., less than a second, such as a few milliseconds).

Controller 110 may also modify some web elements 170 to lower a risk of these web elements 170 being a dark pattern. Specifically, controller 110 may detect that web element 170J has more than a threshold risk of being a dark pattern as a result of pressuring users into a sale. For example, controller 110 may further detect that web element 170J has functionality and/or information that is helpful and/or necessary to webpage 160B, such that it may be disadvantageous to fully block this web element 170J. For example, as depicted web element 170J is a reserve button. In response to determining this, controller 110 may modify web element 170J such that this functionality and/or information remains while a risk of being a dark pattern is lowered (e.g., by blocking the text that created the dark pattern). Controller 110 may do this via modified web element 180 that provides the detected helpful and/or required information and/or functionality without the aspects of web element 170J that increase the risk score.

In other examples, controller 110 may notify a user of web elements 170 that have more than a threshold risk of being a risk pattern. For example, controller 110 may notify a user via notification 190. Notification 190 may provide a calculated risk score of respective web element 170, and/or a reason for this risk score. Controller 110 may provide a user notification 190 on web elements 170 that are blocked (e.g., providing a description of web elements 170 that are blocked, and a description why), and/or controller 110 may provide notification 190 on modified web element 180 (e.g., informing users how and that web elements 170 are modified). In some examples, controller 110 may provide notification 190 without blocking or modifying any of web elements 170.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with user devices 120, user database 130, corpus 140, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to detect web elements 170 that present a dark pattern, and execute a mitigating action to counteract the dark pattern. Controller 110 may utilize processor 220 to thusly detect and mitigate dark patterns. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to detect and mitigate dark patterns accordingly.

Processor 220 may detect and mitigate dark patterns according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may detect and mitigate dark patterns as described herein according to instructions 232 of one or more applications (e.g., software applications) stored in memory 230 of controller 110.

In addition to instructions 232, in some examples gathered or predetermined data or techniques or the like as used by processor 220 to detect web elements that have more than a threshold risk of being a dark pattern (and executing a mitigating action accordingly) as described herein may be stored within memory 230. For example, memory 230 may include information described above that is gathered from user devices 120 or corpus 140, or in some examples memory 230 may include some or all of CNN 130. Specifically, as depicted in FIG. 2, memory 230 may include browsing data 234, which itself includes element data 236. Browsing data 234 may include data on the browsing session, such as the time of year (e.g., the date), the time of day, demographics of the user, types of webpages 160 visited (e.g., where a "type" of webpages 160 may include a clothing store, a vacation rental website, a toy store), or the like. Element data 236 may include functionality provided by web elements 170 (e.g., such as where web elements 170 are hyperlinks), information provided by web elements 170, natural language text provided by web elements 170, risk scores of web elements 170, or the like.

Memory 230 may also include corpus data 140 in the form of historical element data 240. Controller 110 may be configured to functionally compare element data 236 to historical element data 240 using CNN 130 in order to determine risk scores of web elements 170. For example, CNN 130 may have organized historical element data 240 into "types" of elements that have risk scores based on other factors (e.g., the time frame, the type of webpages 160, and/or user demographics), where controller 110 uses CNN 130 to compare the current web elements 170 (and the current factors) against these historical elements in order to determine risk scores of web elements 170.

Memory 230 may include some or all of CNN 130 in neural network data 238. Though in some examples CNN 130 may be a hosted resource that is available to controller 110 as a plugin (e.g., where controller 110 is a plugin on user device 120 and CNN 130 is available to controller 110 via network 150 controller 110 has online capabilities), in other examples a rule framework of CNN 130 is installed within a computer system hosting controller 110 in the form of neural network data 238. Neural network data 238 may include the rules and weights as arranged across the nodes and layers of CNN 130.

Further, memory 230 may include threshold and preference data 242. Threshold and preference data 242 may include thresholds that define a manner in which controller 110 detects risk patterns and provides accompanying mitigating actions. For example, threshold and preference data 242 may include thresholds as identified by CNN 130 at which web elements 170 start to pose a higher risk (e.g., demographic thresholds, time frame thresholds, etc.). In some examples, threshold and preference data 242 may include user defined data, such as a preference for what type of mitigating action to provide. For example, threshold and preference data 242 may specify that a user only prefers notifications 190 for mitigating actions (e.g., and not blocked web elements 170 or modified web elements 180).

For another example, threshold and preference data 242 may include data on types of dark patterns that a user would like mitigated. This may include a nagging dark pattern (e.g., a type of web element 170 that is repeatedly and/or emphatically provided on screen 122), an obstruction dark pattern (e.g., a type of web element 170 that graphically or logically impedes the view or use other web elements 170), a sneaking dark pattern (e.g., a type of web element 170 that attempts to suggest/implant a new idea that is not to the benefit of the user), or the like. Further, controller 110 may use threshold and preference data 242 to use different types of mitigating actions on different types of dark patterns 242 (e.g., modify obstruction-type web elements 170 such that they are present but no longer obstruct, block sneaking dark pattern web elements 170, while leaving nagging dark pattern web elements unmitigated) as defined by a user.

Memory 230 may further include NLP techniques 244. NLP techniques 244 can include, but are not limited to, semantic similarity, syntactic analysis, and ontological matching. For example, in some embodiments, processor 220 may be configured to use natural language data as gathered from web elements 170 of webpages 160 to determine semantic features (e.g., word meanings, repeated words, keywords, etc.) and/or syntactic features (e.g., word structure, location of semantic features in headings, title, etc.) of this natural language data of the web elements 170 and the web page. Ontological matching could be used to map semantic and/or syntactic features to a particular concept of webpages 160, and/or a particular concept of web element 170. The concept can then be used to determine the types of webpages 160 that a user is viewing, and/or the type of web elements 170 of those webpages 160. In this same way, controller 110 may use NLP techniques in feeding web element 170 data into CNN 130 so that CNN 130 may identify risk scores of these web elements 170.

Memory 230 may further include machine learning techniques 246 that controller 110 may use to improve a process of detecting and mitigating dark patterns as discussed herein over time. Machine learning techniques 246 can comprise algorithms or models that are generated by performing supervised, unsupervised, or semi-supervised training on a dataset, and subsequently applying the generated algorithm or model to detect and mitigate dark patterns. Using these machine learning techniques 246, controller 110 may improve an ability to detect and mitigate dark patterns over time. For example, controller 110 may identify over time certain associations that between users, browsing sessions, web elements, time frames, and the like that increase or decrease risks for dark patterns.

Machine learning techniques 246 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 244 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
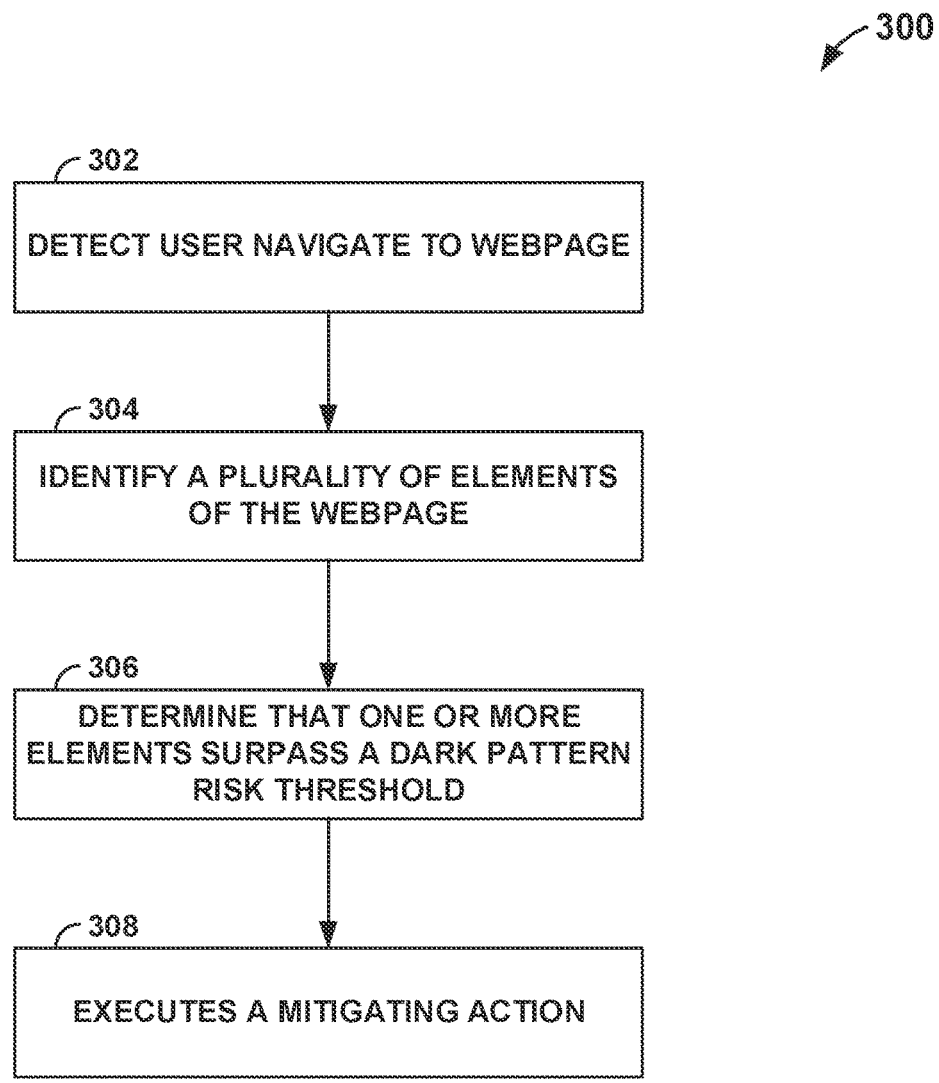
FIG. 3 depicts an example flowchart by which the controller of FIG. 1A detects and mitigates dark patterns of elements of web pages.

Using these components, controller 110 may detect web elements that have a risk score than a threshold of being dark patterns, and mitigate these dark patterns as discussed herein. For example, controller 110 may detect and mitigate dark patterns according to flowchart 300 depicted in FIG. 3. Flowchart 300 of FIG. 3 is discussed with relation to FIG. 1A for purposes of illustration, though it is to be understood that other systems may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 detects a user navigating to webpage 160 (302). For example, controller 110 may detect a user clicking on a graphical icon on screen 122 that will cause user device 120 to navigate to webpage 160. Alternatively, controller 110 may detect a user typing in a URL of webpage 160. Controller 110 identifies a plurality of web elements 170 of webpage 160 (304). Controller 110 may identify this web elements 170 once they are graphically generated on screen 122. Alternatively, controller 110 may identify some or all of these web elements 170 before (or simultaneous with) their generation on screen 122 via analyzing code of webpage 160.

Controller 110 determines that one or more web elements 170 has a risk score that surpasses a risk threshold of being a dark pattern (306). Controller 110 determines that one or more web elements 170 has a risk score that surpasses a risk threshold by analyzing each of the plurality of web elements 170. Controller 110 may use CNN 130 to analyze web elements 170.

As discussed herein, CNN 130 may be trained to calculate dark pattern risk scores of web elements 170 of webpages 160. Training CNN 130 may include using such techniques as pattern matching, image recognition, gaze tracking, NLP, or the like to capture and analyze how users react to various web elements 170 of webpages 160. For example, CNN 130 may be fed such data from corpus 140 in order to train CNN 130. CNN 130 may then learn how to calculate risk scores of various web elements 170 in different settings. For example, CNN 130 may calculate risk scores as normalized coefficients for types of web elements 170.

Once trained, controller 110 may use CNN 130 to determine that the one or more web elements 170 have a risk score that surpasses the risk threshold by comparing the one or more web elements 170 to types of web elements 170 that have been found to have risk scores that surpass the risk threshold. Upon comparing, CNN 130 may identify that the one or more web elements 170 match a type of web elements 170 that has a respective normalized coefficient that surpasses the risk threshold. This may include training the CNN 130 to account for various factors that can increase or decrease risk scores, where factors increase time frames, types of webpages, and user demographics Controller executes a mitigation action configured to counteract the dark pattern (308). Controller 110 executes the mitigating action in response to the one or more web elements 170 having the risk score that surpasses the risk threshold. Controller 110 executes the mitigating action substantially immediately upon the user navigating to webpage 160 (e.g., within 5 or 10 milliseconds of the user requesting that user device 120 generate webpage 160 by clicking on a URL for webpage 160). As discussed herein, the mitigating action may include graphically blocking at least some of the one or more web elements 170 on webpage 160, providing modified web elements 180 rather than the one or more web elements 170, or providing notification 190 regarding the one or more web elements 170.

In certain examples, controller 110 may notify a user that a current set of factors are predicted to increase risk scores by a threshold amount prior to a user even navigating to a respective webpage 160 that exhibits a dark pattern. This may include a situation where controller 110 may use CNN 130 to analyze factors such as the demographics of the user, a time frame of a browsing session, an online query of the user, or the like, and provide a preemptive notification 190 to user regarding a detected increased risk prior to any such risk being realized. For example, controller 110 may determine that a user is a grandparent that provided a query of "what are the best gifts for a 10 year old" on a significant shopping day (e.g., cyber Monday), in response to which controller 110 provides a notification of the increased likelihood for dark patterns even before the user clicks on respective webpages 160 that have such a dark pattern The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   detecting a user navigate to a webpage;
   identifying a plurality of web elements of the webpage;
   determining, by analyzing each of the plurality of web elements, that one or more web elements has a risk score that surpasses a risk threshold of being a dark pattern; and
   executing, substantially immediately upon the user navigating to the webpage, a mitigation action configured to counteract the dark pattern in response to the one or more web elements having the risk score that surpasses the risk threshold.

2. The computer-implemented method of claim 1, wherein the mitigating action includes graphically blocking at least some of the one or more web elements on the webpage.

3. The computer-implemented method of claim 1, wherein the mitigating action includes notifying the user of the dark pattern.

4. The computer-implemented method of claim 1, wherein the mitigating action includes modifying the one or more web elements to reduce the risk score while maintaining a functionality of the one or more web elements.

5. The computer-implemented method of claim 1, further comprising training a convolutional neural network (CNN) to calculate dark pattern risk scores of web elements of webpages, wherein the analyzing each of the plurality of web elements is executed by the CNN.

6. The computer-implemented method of claim 5, wherein training the CNN includes:
   using pattern matching and image recognition to analyze how users react to various web elements of webpages; and
   calculating, based on the analysis, normalized coefficients for types of web elements.

7. The computer-implemented method of claim 6, wherein determining that the one or more web elements have the risk score that surpasses the risk threshold includes:
   comparing the one or more web elements to the types of web elements; and
   identifying that the one or more web elements match one type of the types of web elements that has a respective normalized coefficient that surpasses the risk threshold.

8. The computer-implemented method of claim 5, further comprising training the CNN to identify factors that increase risk scores, where factors increase time frames, types of webpages, and user demographics.

9. The computer-implemented method of claim 5, further comprising the CNN affirmatively notifying a user in response to determining that a current set of factors of a session are predicted to increase risk scores by a threshold amount.

10. A system comprising:
    a processor; and
    a memory in communication with the processor, the memory containing instructions that, when executed by the processor, cause the processor to:
    detect a user navigate to a webpage;
    identify a plurality of web elements of the webpage;
    determine, by analyzing each of the plurality of web elements, that one or more web elements has a risk score that surpasses a risk threshold of being a dark pattern; and
    execute, substantially immediately upon the user navigating to the webpage, a mitigation action configured to counteract the dark pattern in response to the one or more web elements having the risk score that surpasses the risk threshold.

11. The system of claim 10, wherein the mitigating action includes graphically blocking at least some of the one or more web elements on the webpage.

12. The system of claim 10, wherein the mitigating action includes notifying the user of the dark pattern.

13. The system of claim 10, wherein the mitigating action includes modifying the one or more web elements to reduce the risk score while maintaining a functionality of the one or more web elements.

14. The system of claim 10, the memory containing further instructions that, when executed by the processor, cause the processor to train a convolutional neural network (CNN) to calculate dark pattern risk scores of web elements of webpages, wherein the analyzing each of the plurality of web elements is executed by the CNN.

15. The system of claim 14, wherein training the CNN includes:
- using pattern matching and image recognition to analyze how users react to various web elements of webpages; and
- calculating, based on the analysis, normalized coefficients for types of web elements.

16. The system of claim 15, wherein determining that the one or more web elements have the risk score that surpasses the risk threshold includes:
- comparing the one or more web elements to the types of web elements; and
- identifying that the one or more web elements match one type of the types of web elements that has a respective normalized coefficient that surpasses the risk threshold.

17. The system of claim 14, the memory containing further instructions that, when executed by the processor, cause the processor to train the CNN to identify factors that increase risk scores, where factors increase time frames, types of webpages, and user demographics.

18. The system of claim 14, the memory containing further instructions that, when executed by the processor, cause the processor to cause the CNN to affirmatively notify a user in response to determining that a current set of factors of a session are predicted to increase risk scores by a threshold amount.

19. A computer program product, the computer program product comprising a computer readable storage medium having program instructions embodied therewith, the program instructions executable by a computer to cause the computer to:
- detect a user navigate to a webpage;
- identify a plurality of web elements of the webpage;
- determine, by analyzing each of the plurality of web elements, that one or more web elements has a risk score that surpasses a risk threshold of being a dark pattern; and
- execute, substantially immediately upon the user navigating to the webpage, a mitigation action configured to counteract the dark pattern in response to the one or more web elements having the risk score that surpasses the risk threshold.

20. The computer program product of claim 19, wherein the mitigating action is selected from the group consisting of:
- graphically blocking at least some of the one or more web elements on the webpage;
- notifying the user of the dark pattern; and
- modifying the one or more web elements to reduce the risk score while maintaining a functionality of the one or more web elements.

* * * * *